(12) United States Patent
Van Wyck Loomis

(10) Patent No.: US 7,295,156 B2
(45) Date of Patent: Nov. 13, 2007

(54) CELLPHONE GPS POSITIONING SYSTEM

(75) Inventor: Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 117 days.

(21) Appl. No.: 11/199,409

(22) Filed: Aug. 8, 2005

(65) Prior Publication Data

US 2007/0040741 A1    Feb. 22, 2007

(51) Int. Cl.
*H04B 7/185*    (2006.01)
(52) U.S. Cl. .................................. 342/357.15
(58) Field of Classification Search ................
342/357.01–357.17, 450–465; 455/456.1–457
See application file for complete search history.

(56) References Cited

U.S. PATENT DOCUMENTS

| | | | |
|---|---|---|---|
| 5,045,861 A | 9/1991 | Duffett-Smith | |
| 5,327,144 A | 7/1994 | Stilp et al. | |
| 5,365,450 A | 11/1994 | Schuchman et al. | |
| 5,594,453 A | 1/1997 | Rodal et al. | |
| 5,608,410 A | 3/1997 | Stilp et al. | |
| 5,663,735 A | 9/1997 | Eschenbach | |
| 5,798,732 A | 8/1998 | Eschenbach | |
| 5,838,279 A | 11/1998 | Duffett-Smith et al. | |
| 5,841,396 A | 11/1998 | Krasner | |
| 5,854,605 A | 12/1998 | Gildea | |
| 5,883,594 A | 3/1999 | Lau | |
| 5,890,068 A * | 3/1999 | Fattouche et al. | 455/456.2 |
| 5,917,444 A * | 6/1999 | Loomis et al. | 342/357.12 |
| 6,075,987 A * | 6/2000 | Camp et al. | 455/427 |
| 6,081,229 A * | 6/2000 | Soliman et al. | 342/357.05 |
| 6,094,168 A | 7/2000 | Duffett-Smith et al. | |
| 6,115,599 A | 9/2000 | Stilp | |

(Continued)

FOREIGN PATENT DOCUMENTS

WO    WO 00/10031    2/2000

(Continued)

OTHER PUBLICATIONS

Jami I et al "Comparison of method and locating and tracking cellular mobiles", IEE Colloquium Novel Methods of Location and Tracking of Cellular Mobiles and their System Application, IEE London, BG, May 17, 1999, pp. 1-6, XP0065009672.

(Continued)

*Primary Examiner*—Thomas H. Tarcza
*Assistant Examiner*—Shelley Chen
(74) *Attorney, Agent, or Firm*—Menlo Patent Agency LLC

(57) ABSTRACT

A mobile GPS location system. The location system includes a mobile radio transceiver for transmitting a radio positioning signal and receiving a responsive radio system signal having a radio positioning system (RPS)-based time and position derived from the radio positioning signal; a mobile global positioning system (GPS) receiver; and a code range selector using the RPS-based time and position for selecting a code search range. The mobile GPS receiver uses the code search range for focusing a code phase search to a narrow range for rapidly acquiring a GPS signal. The RPS-based time and position are derived from a plurality of radio signal times-of-arrival (TOA)s determined by a plurality of system units from the radio positioning signal.

24 Claims, 6 Drawing Sheets

U.S. PATENT DOCUMENTS

| | | | |
|---|---|---|---|
| 6,121,923 A * | 9/2000 | King | 342/357.12 |
| 6,122,506 A | 9/2000 | Lau et al. | |
| 6,133,874 A | 10/2000 | Krasner | |
| 6,188,351 B1 * | 2/2001 | Bloebaum | 342/357.15 |
| 6,188,354 B1 * | 2/2001 | Soliman et al. | 342/387 |
| 6,191,731 B1 | 2/2001 | McBurney et al. | |
| 6,208,291 B1 | 3/2001 | Krasner | |
| RE37,408 E * | 10/2001 | Loomis et al. | 342/357.12 |
| 6,300,899 B1 * | 10/2001 | King | 342/357.12 |
| 6,313,787 B1 * | 11/2001 | King et al. | 342/357.03 |
| 6,327,473 B1 * | 12/2001 | Soliman et al. | 455/456.1 |
| 6,342,854 B1 | 1/2002 | Duffett-Smith et al. | |
| 6,429,811 B1 * | 8/2002 | Zhao et al. | 342/357.09 |
| 6,429,815 B1 * | 8/2002 | Soliman | 342/357.15 |
| 6,430,416 B1 | 8/2002 | Loomis | |
| 6,865,380 B2 | 8/2002 | Syrjarinne et al. | |
| 6,529,165 B1 | 3/2003 | Duffett-Smith et al. | |
| 6,546,040 B1 | 4/2003 | Eschenbach | |
| 6,583,758 B2 * | 6/2003 | King | 342/357.13 |
| 6,603,978 B1 | 8/2003 | Carlsson et al. | |
| 6,665,332 B1 | 12/2003 | Carlson et al. | |
| 6,678,510 B2 | 1/2004 | Syrjarinne et al. | |
| 6,748,202 B2 | 6/2004 | Syrjarinne et al. | |
| 6,839,020 B2 * | 1/2005 | Geier et al. | 342/357.02 |
| 6,845,240 B2 | 1/2005 | Carlson et al. | |
| 6,856,282 B2 | 2/2005 | Mauro et al. | |
| 6,871,061 B1 * | 3/2005 | Koorapaty et al. | 455/404.2 |
| 6,871,077 B2 | 3/2005 | Kennedy et al. | |
| 6,876,859 B2 | 4/2005 | Anderson et al. | |
| 6,894,644 B2 | 5/2005 | Duffett-Smith et al. | |
| 6,920,329 B2 | 7/2005 | Kennedy et al. | |
| 6,965,760 B1 * | 11/2005 | Chen et al. | 455/226.1 |
| 2002/0123352 A1 * | 9/2002 | Vayanos et al. | 455/456 |
| 2002/0149518 A1 | 10/2002 | Haataja et al. | |
| 2004/0239558 A1 * | 12/2004 | Geier et al. | 342/357.06 |
| 2005/0055160 A1 * | 3/2005 | King | 701/213 |

FOREIGN PATENT DOCUMENTS

| | | |
|---|---|---|
| WO | WO 00/73813 A1 | 12/2000 |
| WO | WO 00/10031 | 12/2001 |
| WO | WO 01/92911 | 12/2001 |
| WO | WO 02/31526 | 4/2002 |
| WO | WO 2005/071430 A1 | 8/2005 |

OTHER PUBLICATIONS

Peter J. Duffett-Smith & Paul Hansen, "Precise Time Transfer in a Mobile Radio Terminal", Proceeding of ION NTM 2005, Jan. 24-26, 2005, San Diego, California, pp. 1101-1106.

Walter R. Fried, "Operational Benefits and Design Approaches for Combining JTIDS and GPS Navigation", Journal of The Institute of Navigation, vol. 31, No. 2, Summer 1984, pp. 112-128.

Cambridge Positioning System, "CPS, www.cpslocates.com, Introduction to Matrix", published by Frost & Sullivan, 2005, slides 1-22.

Peter J. Duffett-Smith & Paul Hansen, "Accurate Time Assistance, Synchronizing GSM Mobile Telephones to Microseconds" GSP World, Jul. 2005, pp. 44-49.

* cited by examiner

CELLPHONE GPS POSITIONING SYSTEM

BACKGROUND OF THE INVENTION

1. Field of the Invention

The invention relates generally to cellphone GPS location systems and more particularly to a positioning system using radio signal times-of-arrival for determining a radio positioning system (RPS)-based position and time and then using the RPS-based position and time for improving the speed and sensitivity of a GPS receiver for acquiring GPS signals.

2. Description of the Background Art

The global positioning system (GPS) is a system using GPS satellites for broadcasting GPS signals having information for determining position and time. Each GPS satellite broadcasts a GPS signal having twenty millisecond data bits modulated by a one millisecond pseudorandom noise (PRN) code having 1023 bits or chips. The PRN code is known as a spreading code because it spreads the frequency spectrum of the GPS signal. This spread spectrum signal is known as a direct sequence spread spectrum (DSSS) signal.

The GPS signals from all the satellites are broadcast at about the same carrier frequency. However, the PRN code for each GPS satellite is different, thereby enabling a GPS receiver to distinguish the GPS signal from one GPS satellite from the GPS signal from another GPS satellite. The twenty millisecond data bits are organized into frames of fifteen hundred bits. Each frame is subdivided into five subframes of three hundred bits each. Near the start of each subframe is a Zcount having the GPS clock time that the subframe was transmitted. A GPS receiver determines a one-way range, called a pseudorange because it includes a local time offset, to a GPS satellite from the time-of-arrival of the PRN code, the Zcount and ephemeris parameters in the GPS signal that it receives from that GPS satellite. Normally four or more pseudoranges are used for determining or overdetermining a three dimensional position and GPS time. Three GPS satellites are sufficient if altitude is known or assumed.

GPS receivers are used in many applications where it is important to minimize the time duration between the time when the GPS receiver is turned on, or returns from a standby mode, and the time when it provides its position. This time duration, known as the time to first fix (TTFF), generally includes (i) the time to acquire GPS signal power by tuning a local frequency and a local PRN replica code phase in the GPS receiver to match the carrier frequency and the PRN code phase of the incoming GPS signal, (ii) the time to receive data bits in the GPS signal to determine a GPS clock time, (iii) the time to receive ephemeris parameters in the GPS data bits, and (iv) the time to process the code phase timing, GPS clock time and ephemeris for determining a position.

Conventional GPS receivers acquire signal power with a search algorithm. In a typical search algorithm, the local frequency is set to a first trial frequency and then correlations are determined between the incoming GPS signal PRN code and all possible code phases of a local replica of the code. In order ensure that the correct code phase is not missed, it is conventional to increment the replica code phase in one-half chip or even smaller steps. A high correlation value indicates that signal power has been found. If no correlations are high enough, the local frequency is set to a second trial frequency and the correlations are repeated. Although no one correlation will take a great deal of time, the great number of correlations that must be performed can result in the time to find signal power to acquire a GPS signal being the largest single component of the time to first fix (TTFF).

There is a need for reducing the time that is required to acquire signal power in a GPS signal in order to reduce the total time to first fix in a GPS receiver.

SUMMARY OF THE INVENTION

An object of the present invention is to reduce the time for acquiring signal power in a GPS signal by first determining radio signal times-of-arrival (TOA)s in a radio positioning system; using the radio signal TOAs for computing a radio positioning system (RPS)-based position and time; and then using the RPS-based position and time for presetting a local GPS PRN replica code phase close to the GPS PRN code phase of an incoming GPS signal in order to reduce the number correlations that need to be performed in order to find the correct GPS signal code phase.

Briefly, in a preferred embodiment, the present invention is a radio positioning system (RPS) apparatus having a server and three system units; and a mobile unit having a radio transceiver, a code range selector, and a GPS receiver. The mobile GPS receiver tunes its local reference frequency according to an accurate frequency in a radio system signal from the RPS apparatus; stores ephemeris parameters received from the RPS apparatus; and receives an RPS-based position and time from the RPS apparatus. The mobile GPS receiver uses the RPS-based position and time and ephemeris parameters for narrowing its search range for finding the correct PRN code phase for acquiring a GPS signal.

The RPS apparatus derives the RPS-based position and time together from the times-of-arrival (TOA)s of a radio positioning signal transmitted by the mobile transceiver. The system units determine respective TOAs for the radio positioning signal according to GPS time. The server uses the radio signal TOAs for deriving the RPS-based geographical position for the mobile unit and the time-of-transmission (TOT) of the radio positioning signal.

The mobile transceiver generates a local TOT trigger to the code range selector for the time-of-transmission of the radio positioning signal. The code range selector uses the TOT trigger for determining an elapsed time between the transmission of the radio positioning signal and a current time; and then adds the elapsed time to the RPS-based time for determining an RPS-based estimate of current GPS time. The RPS-based GPS time estimate is moved back to the GPS satellite by the transit time of the GPS signal to predict a particular code chip that is currently being received. The transit time is determined from the RPS-based position of the mobile unit and the location-in-space of the GPS satellite. The location-in-space of the GPS satellite is determined from the ephemeris parameters and the RPS-based GPS time estimate.

The code range selector issues a code search range having a search width about a search range center for the current predicted chip. The mobile GPS receiver searches within the code search range for the code of the incoming GPS signal. The search width is based on the expected accuracies of the RPS-based position and time, the error of the elapsed time, and the expected accuracies of the TOAs including multipath and other delay variations in the radio positioning signal. The error in the elapsed time depends upon the drift rate of a local frequency reference in the mobile unit and the length of the elapsed time. In the present invention, typical expected accuracies, drift rates and elapsed times enable the mobile GPS receiver to focus its code phase search so that only a few of the total possible replica PRN code phases or times need to be correlated with the incoming signal PRN code for finding GPS signal power, thereby reducing the time to first fix.

In a preferred embodiment the present invention is a location system comprising: a mobile radio transceiver for transmitting a radio positioning signal and receiving a radio system signal having a radio positioning system (RPS)-based time and an RPS-based position jointly derived from the radio positioning signal; and a mobile global navigation satellite system (GNSS) receiver including a code range selector using the RPS-based time and the RPS-based position for selecting a code search range and a code recovery circuit using the code search range for acquiring a GNSS signal.

In another preferred embodiment the present invention is a mobile location method comprising: transmitting a radio positioning signal from a mobile unit; receiving a radio system signal in the mobile unit having a radio positioning system (RPS)-based time and an RPS-based position jointly derived from the radio positioning signal; selecting a code search range according to the RPS-based time and the RPS-based position; and acquiring a GNSS signal using the selected code search range.

These and other objects and advantages of the present invention will no doubt become obvious to those of ordinary skill in the art after viewing the drawings and reading the following detailed descriptions for several embodiments for carrying out the invention.

BEST MODE FOR CARRYING OUT THE INVENTION

The details of the preferred embodiments for carrying out the idea of the invention will now be described. It should be understood that the description of these details is not intended to limit the invention to these details. On the contrary these details are merely intended to describe the best mode known to the inventors for carrying out the idea of the invention. Numerous alternatives, modifications and equivalents of the embodiments described herein will be apparent to someone skilled in the art as within the scope of the idea of this invention.

The invention is described in terms of a preferred embodiment for the global positioning system (GPS) using C/A code modulated GPS signals. However, the idea may be applied to the P code GPS signals. Further, it will be apparent to those in the art that the invention may be carried out with a generic global navigation satellite system (GNSS) with the global positioning system (GPS), the global orbiting navigation system (GLONASS), the Galileo system or a combination of these systems using a code for modulating their signals in a way that is sometimes known as direct sequence spread spectrum DSSS. It should also be noted that pseudolites may be used in place of satellites for broadcasting GNSS positioning signals.

Figure 1:
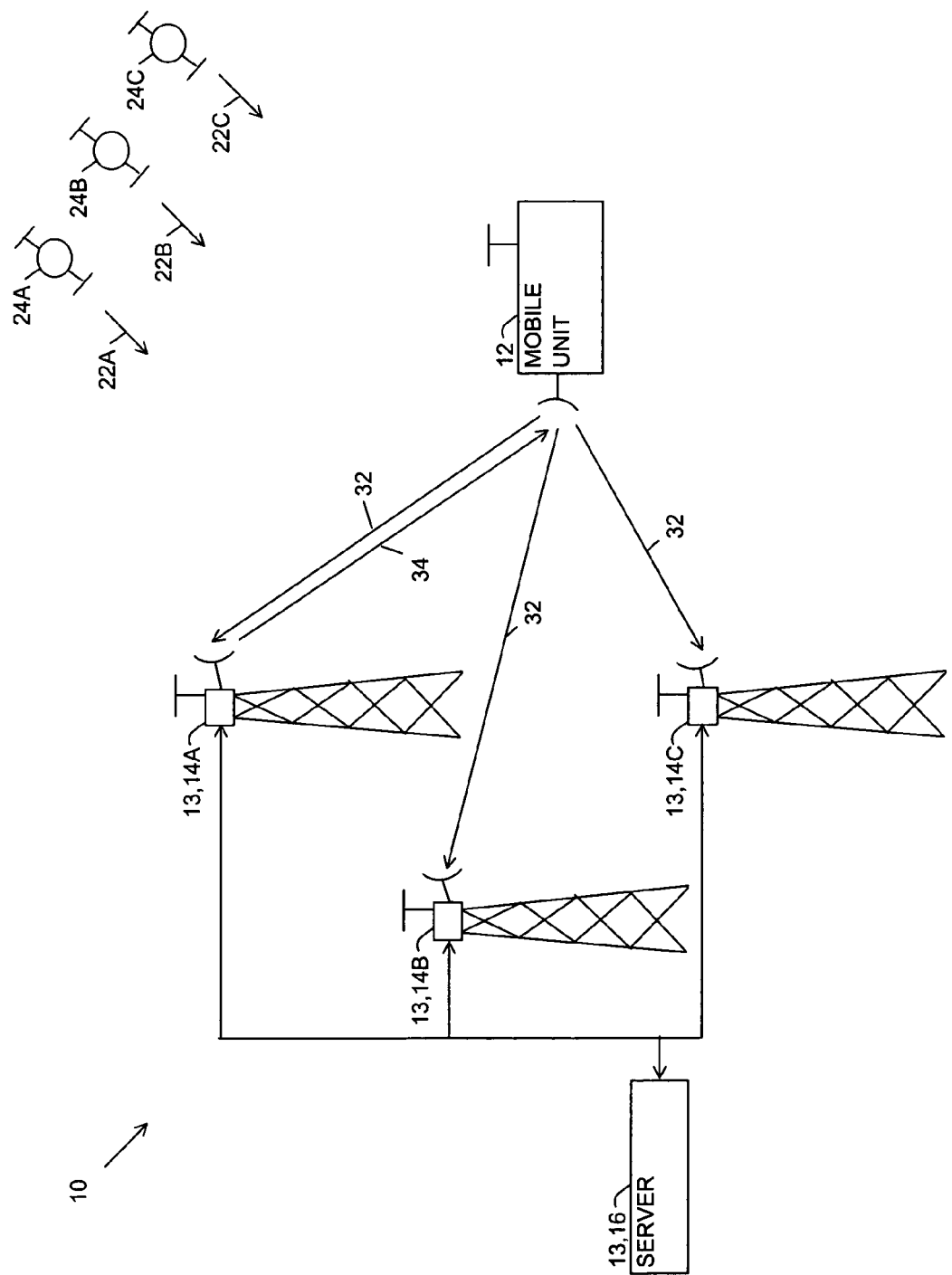
FIG. 1 is a block diagram of a location system of the present invention.

FIG. 1 is a block diagram of a location system of the present invention referred to with a reference number 10. The system 10 includes a mobile unit 12 and a radio positioning system (RPS) 13. The RPS apparatus 13 includes three or more system units 14A, 14B and 14C, and a server 16. The system units 14A-C have known positions from a survey or some other means and are synchronized in time. The server 16 may be located with one of the system units 14A-C or separately. The mobile unit 12 receives three or more GPS signals referred to with reference identifiers 22A-C. The GPS signals 22A-C are broadcast by respective GPS signal sources 24A-C. The GPS signal sources 24A-C are normally GPS satellites, however GPS pseudolites may be used. In the following description, the GPS signals 22A-C are abbreviated as GPS signals 22 and the GPS signal sources 24A-C are referred to as GPS satellites 24. The mobile unit 12 may operate as a cellular telephone and the system units 14A-C may operate as cellular telephone transceiver units with improvements of the present invention. The cellular telephone operation preferably, but not necessarily, corresponds to a Groupe Special Mobile or Global System for Mobile Communication (GSM) cellular telephone standard.

The mobile unit 12 transmits a radio positioning signal 32 that is referenced to a local time maintained in the mobile unit 12. The system units 14A-C use the GPS signals 22 from one or more GPS satellites 24 to determine GPS-based time. The system units 14A-C receive the radio positioning signal 32. Then, each of the system units 14A-C determines a time-of-arrival (TOA) for the radio positioning signal 32 using the GPS time as a reference.

The system units 14A-C pass the radio signal TOAs to the server 16. The server 16 uses several radio signal TOAs and known geographical positions of the system units 14A-C for jointly determining an RPS-based time-of-transmission (TOT) of the radio signal 32 and an RPS-based two dimensional (2D) position of the mobile unit 12. The RPS-based position is the position of the mobile unit 12 at the RPS-based time (TOT). A fourth system unit may be used for overdetermining the 2D position of the mobile unit 12. Or, a fourth system unit that is not co-planar with the other three system units may be used for determining a 3D position of the mobile unit 12. The accuracies of the RPS-based position and time are generally less accurate than a GPS-based position and time that is obtainable by almost any GPS receiver, even without the use of differential GPS corrections, due to multipath of the radio positioning signal 32, tropospheric delay variations, and other factors.

The system 13 passes the RPS-based time and position back to the mobile unit 12 either directly from the server 16 or through one or more of the system units 14A-C in a radio system signal 34. The mobile unit 12 uses the RPS time and position information as an approximate time and position to focus its search to find signal power for acquiring the GPS signals, and then uses the GPS signals for determining its exact (within GPS accuracy) time and position. The radio system signal 34 may include the GPS ephemeris and almanac orbital parameters to assist the mobile unit 12 in its GPS signal acquisition and position determination. The radio system signal 34 may also have an accurate carrier or subcarrier frequency that the mobile unit 12 can use for tuning its local reference frequency for acquiring the GPS signal.

Figure 2:
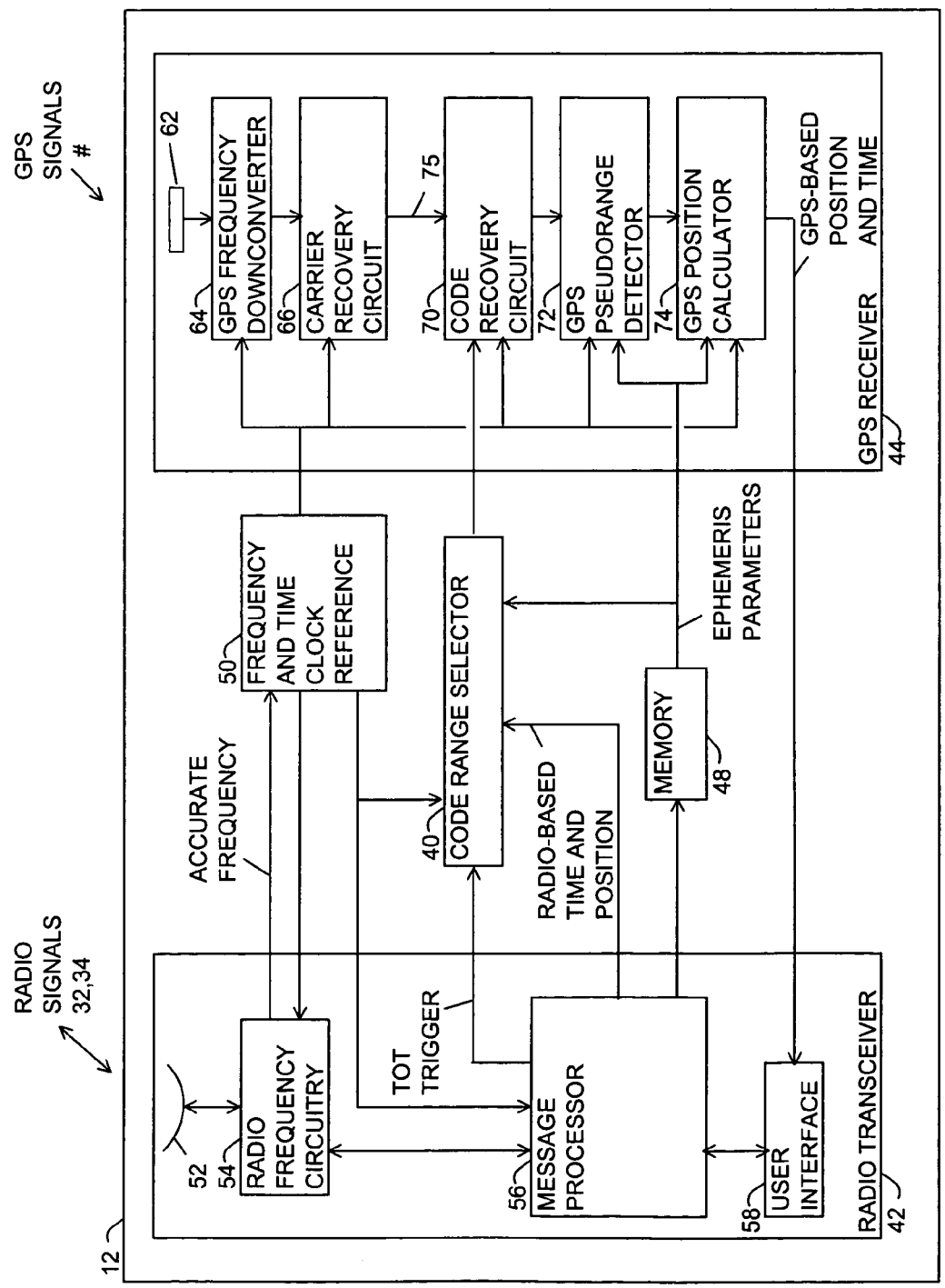
FIG. 2 is a block diagram of a mobile unit of the system of FIG. 1.

FIG. 2 is a block diagram of the mobile unit 12. The mobile unit 12 includes a code range selector 40, a radio transceiver 42, a GPS receiver 44, a memory 48, and a frequency and time clock reference 50. The code range selector 40, memory 48, and/or the frequency and time clock reference 50 may be included as part of the radio transceiver 42 or the GPS receiver 44.

The radio transceiver 42 includes a radio antenna 52, a radio frequency circuit 54, a message processor 56, and a user interface 58. The user interface 58 has a display, keys and digital input/output capability for a human user to use the mobile unit 12 as a GPS position determining device and a cellular telephone or two-way radio. The message processor 56 includes a microprocessor and memory operating in a conventional manner to control functions of the elements of the code range selector 40, radio transceiver 42, GPS receiver 44, memory 48, and clock reference 50 of the mobile unit 12. Further, the functions within the elements may be implemented with hardware, microprocessor-readable code in a memory and with digital signal processing (DSP) hardware and software. The memory 48 stores GPS ephemeris, almanac and other GPS parameters and mobile unit status parameters.

To initiate position determination, the message processor 56 uses a clock signal from the clock reference 50 to generate a radio positioning message. The radio positioning message is passed to the radio frequency circuitry 54. The radio frequency circuitry 54 modulates the radio positioning message onto a carrier and passes a radio frequency (RF) signal carrying the radio positioning message to the radio antenna 52. There may be several radio transmissions back and forth between the mobile unit 12 and at least one of the system units 14A-C before the radio-positioning signal 32 in order to calibrate the carrier frequency and timing of the radio positioning signal 32 to the frequency and time used by the system units 14A-C. This calibration may be used to calibrate the frequency and time clock reference 50. The message processor 56 also passes a trigger to the code range selector 50 for locally marking the time-of-transmission TOT of the radio positioning signal 32. It is important that the TOT trigger is coincident or has a known offset with the actual transmission of the radio positioning signal 32 so that the actual time-of-transmission (TOT) may be accurately determined within the mobile unit 12.

With a few tens of seconds, the radio antenna 52 receives the radio system signal 34 having an RPS-based position and time that has been calculated by the server 16 and passes the RPS-based position and time information to the message processor 56. The RPS-based time is the GPS-based time-of-transmission (TOT) of the radio positioning signal 32. The message processor 56 passes the RPS-based position and time information to the code range selector 40. The code range selector 40 uses the RPS-based position and time, the TOT trigger, clock signals from the clock reference 50, and ephemeris parameters from the memory 48 for selecting a narrow code search range for the GPS receiver 44 in order to reduce the time required by the GPS receiver 44 for acquiring the GPS signals 22.

The carrier frequency or a subcarrier frequency difference of the radio system signal 34 may be used for calibrating the frequency and time clock reference 50. When the calibrated frequency and time is more accurate than a local reference frequency maintained by the GPS receiver 44, the GPS receiver 44 uses the more accurate frequency and time for assisting its acquisition of the GPS signals 22. The radio system signal 34 may also include ephemeris, almanac and/or other GPS parameters. The message processor 56 passes these parameters to the memory 48. The code range selector 40 uses the parameters for determining a code phase range and the GPS receiver 44 uses these parameters for assisting the determination of GPS-based pseudoranges and GPS-based position and time.

The GPS receiver 44 includes a GPS antenna 62, a GPS frequency downconverter 64, carrier recovery circuit 66, a code recovery circuit 70, a GPS pseudorange detector 72, and a GPS position calculator 74. The frequency and time clock 50 provides signals having frequencies and/or timing based on a local oscillator (LO) frequency reference.

The GPS antenna 62 converts the GPS signals 22 from airwave signals to conducted signals and passes the conducted GPS signals to the GPS frequency downconverter 64. The GPS frequency downconverter 64 uses the signals from the frequency and time clock reference 50 for converting the conducted GPS signals to digital GPS signals at a lower frequency.

The GPS frequency downconverter 64 passes the digital GPS signals to the carrier recovery circuit 66. The carrier recovery circuit 66 uses the signals from the frequency and time clock reference 50 as a starting point in frequency for searching for the correct carrier frequencies in the digital GPS signals in order to acquire and then to track the GPS signals 22 in order to effectively tune out the Doppler frequency variations of the GPS signals 22 and frequency drift in the frequency and time clock reference 50. The carrier recovery circuit 66 passes intermediate frequency (IF) or baseband (BB) digital GPS signals 75 representing the GPS signals 22, respectively, to the code recovery circuit 70. The GPS signals 75 may be pseudo-BB IF signals where the carrier frequencies of the signals 75 are lower than the bandwidths of the modulations on the signals 75.

The code recovery circuit 70 generates respective replicas for the pseudorandom (PRN) codes that correspond to the GPS satellites 24 that are available. A particular one of the GPS signals 75 corresponds to particular one of the GPS satellites 24 having a particular PRN code that enables the GPS signal 75 for that one of the GPS satellites 24 to be acquired in the presence of the GPS signals 75 for the other GPS satellites 24. Each GPS signal 75 and each replica has 1023 code chips of the C/A PRN code that may be labeled bit or chip or time or phase 0 through 1022. In order to find the correct code phase of the PRN code of the GPS signal 22 and GPS signal 75 for a particular GPS satellite 24, the replica PRN code for that GPS satellite 24 is generated or phase shifted to several phases for a serial search and then correlated at each phase against the GPS signal 75.

A high correlation level indicates the correct PRN code phase has been determined at that replica PRN code phase and the GPS signal 22 has been acquired. When no correlation level in the search range is high enough to indicate signal acquisition, the carrier recovery circuit 66 steps to new carrier frequency and the code phase correlation process is repeated. Several carrier frequencies may need to be tried before the correct carrier frequency is found where one of the code phases provides a high correlation. Importantly, the code range selector 40 in the present invention provides a code search range having only a relatively small number out of a possible number of code phases, thereby enabling the code recovery circuit 70 to find the correct code phase quickly for the GPS signal 22.

The GPS pseudorange detector 72 uses the timing of the code phase with clock signals from the clock reference 50 for determining a GPS pseudorange between the GPS antenna 12 and the GPS satellite 24. The GPS position calculator 74 uses an assumed altitude and three pseudoranges with ephemeris parameters for three GPS satellites 24 and clock signals from the clock reference 50 for calculating a GPS-based 2D position and time. A 3D position may be determined using pseudoranges and ephemeris for more than three GPS satellites, or a 2D position may be overdetermined. With more than four GPS pseudoranges and ephemeris, a 3D position may be overdetermined.

Figure 3:
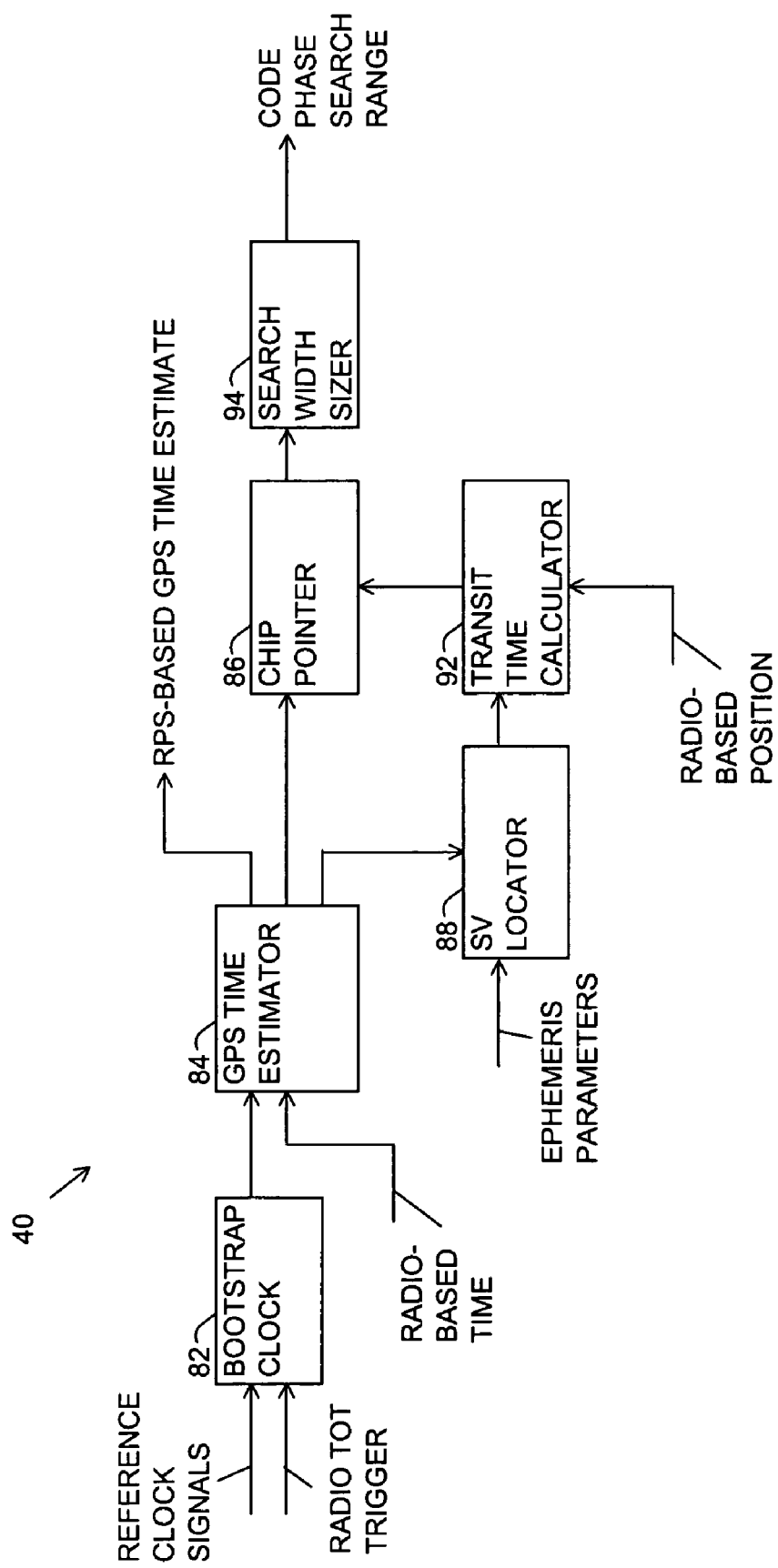
FIG. 3 is a block diagram of a code range selector of the mobile unit of FIG. 2.

FIG. 3 is a block diagram of the code range selector 40 of the present invention. The range selector 40 includes a bootstrap clock 82, a GPS time estimator 84, a chip pointer 86, a satellite (SV) locator 88, a transit time calculator 92, and a search width sizer 94. The message processor 56 (FIG. 2) issues the TOT trigger to the bootstrap clock 82 at the time-of-transmission of the radio positioning signal 32 or at a known offset time from the time-of-transmission. The bootstrap clock 82 uses the TOT trigger and the offset time to start or re-calibrate a bootstrap time in order to determine the elapsed time from the time-of-transmission of the radio positioning signal 32. The bootstrap clock 82 may be implemented as a counter that is driven from the clock reference 50.

The GPS time estimator 84 adds the bootstrap time to the RPS-based time from the message processor 56 (FIG. 2) for providing an RPS-based estimate of the current GPS time. This GPS time estimate is based on the radio signal TOAs that were determined from the radio positioning signal 32 by the system units 14A-C. The RPS-based GPS time estimate is passed to the GPS pseudorange detector 72 (FIG. 2) and the GPS position calculator 74 (FIG. 2). The GPS pseudorange detector 72 and the GPS position calculator 74 use the RPS-based GPS time estimate for GPS data bit timing, pre-detection interval (PDI) timing, linearizing pseudoranges, and for avoiding the need to wait for the Zcount in the GPS data bits. The chip pointer 86 uses the GPS time estimate with the transit time of the GPS signal provided by the transit time calculator 92 for predicting the chip position or phase in the PRN code that the GPS receiver 44 should be receiving at the current time in the GPS signals 22 from each of the GPS satellites 24.

The SV locator 88 uses the RPS-based GPS time estimate with ephemeris parameters for determining a location-in-space for the GPS satellite 24. The transit time calculator 92 divides the difference between the location-in-space and the RPS-based position of the mobile unit 12 by the speed of light for determining the transit time from the satellite 24 to the mobile unit 12 and provides the transit time to the chip pointer 86. In an alternative embodiment the RPS-based position may be replaced by a position entered by a user or a position stored from a previous GPS-based position fix.

The code search range is centered at the predicted current PRN code chip. The width of the code search range is chosen according to the expected accuracy of the RPS-based GPS time estimate and the expected accuracy of the transit time. The accuracy of the RPS-based GPS time estimate depends upon the accuracy of the RPS-based time and the accuracy of the bootstrap elapsed time. The accuracy of the bootstrap elapsed time depends upon the accuracy of the calibration of the TOT trigger to the actual time-of-transmission of the radio positioning signal 32, the drift rate of the frequency and time clock reference 50 times the length of the elapsed bootstrap time between the TOT and the current time. The accuracy of the transit time depends upon the accuracy of the RPS-based position, the accuracy of the locations-in-space of the GPS satellites 24, and the dilution of precision for the geometry of the positions of the GPS satellites 24. The accuracy of the locations-in-space depend upon the RPS-based GPS time estimate. The accuracies of the RPS-based time and position depend together upon the effects of multipath and other factors on the transmission times of the radio positioning signal 32 to the system units 14A-C, the accuracies of the time measurements of the TOAs of the radio positioning signal 32, and the dilution of precision for the geometry of the positions of the system units 14A-C. A simple preferred search width is two times the sum of the expected accuracy of the RPS-based GPS time estimate, the RPS-base position divided by the speed of light, and one-half chip. The factor two is used because the expected accuracy designated as plus and minus about the predicted center chip.

The chip width of the GPS C/A PRN code is 1540/1575.42 microseconds or approximately one microsecond. An error of approximately one microsecond in the RPS-based GPS time estimate and an error of approximately three hundred meters of the RPS-based position in the direction to the GPS satellite 24 with one-half chip on each side results in a code search range of five 1/1023 phases or chips of the C/A code centered at the predicted PRN chip. For preferred embodiments of the present invention the search width is somewhere in the range of five to twenty-five microseconds or five to twenty-five phases or chips for the C/A GPS PRN code. The search width sizer 94 applies the search range width to the predicted chip phase and passes the code search range to the code recovery circuit 70 for aiding GPS signal acquisition by narrowing its code phase search.

Figure 4:
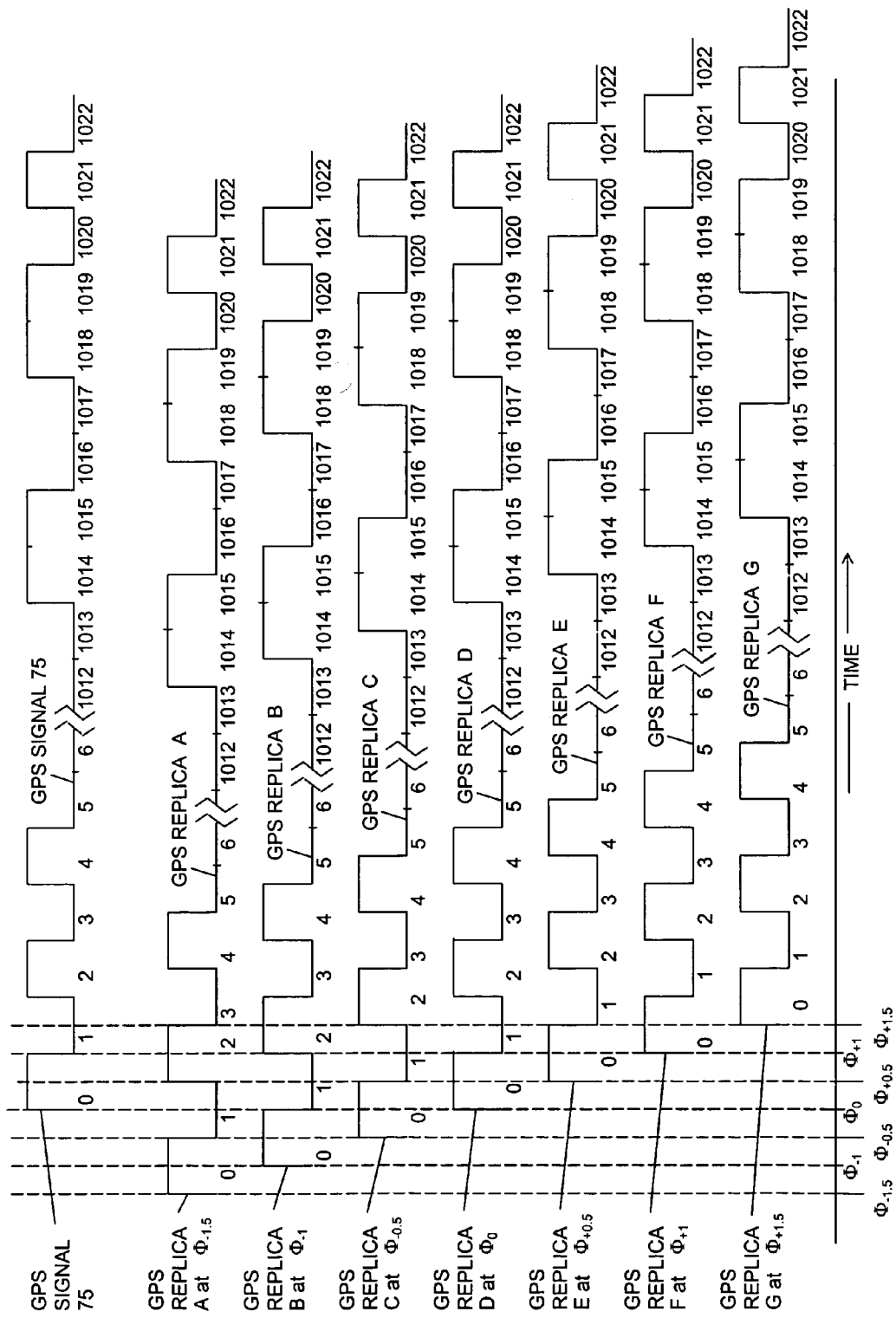
FIG. 4 is a phase timing chart for a code recovery circuit in the mobile unit of FIG. 2.

FIG. 4 is a timing chart illustrating code phases for exemplary GPS replicas A, B, C, D, E, F and G with respect to the GPS signal 75. The code recovery circuit 70 acquires or recovers the phase of the PRN code in the GPS signal 75 by generating or phase shifting in increments a local GPS replica having the same PRN code. The increments may be viewed equally well as time increments, phase increments or chip increments.

For signal acquisition, the GPS replicas A-G for each of the phase shift increments is correlated against the GPS signal 75. The phase shift yielding the greatest correlation that is greater than a correlation threshold is identified as the code phase of the GPS signal 75. For 1023 chips, there are 2046 possible half-chip code phases. Performing correlations on all 2046 code phases for acquiring the GPS signal 22 is time-consuming, especially when the GPS signal 22 has a low signal level and/or the frequency relationship between the frequency reference 50 and the carrier frequency of the GPS signal 22 is not well known.

Importantly, the present invention uses the RPS-based GPS time estimate for reducing the number of code phases that must be correlated. The GPS signal 75 and the GPS replicas A-G have the same PRN code having chips or phases 0 through 1022. The GPS replicas A, B, C, D, E, F and G are illustrated for respective code phases of minus one and one-half chips $\phi_{-1.5}$, minus one chip $\phi_{-1.0}$, minus one-half chip $-\phi_{-0.5}$, zero chips $\phi_0$, plus one-half chip $\phi_{+0.5}$, plus one chip $\phi_{+1.0}$ and plus one and one-half chips $\phi_{+1.5}$, with respect to the GPS signal 75. When the correlations are performed, the GPS replica D will correlate with the GPS signal 75. The GPS replicas A-G represent a code search range of three chips out of the possible 1023 chips of the PRN code in its replica code phase.

As an approximate rule, each microsecond or three hundreds meters of expected error adds two code chips (phases) to the width of the search range out of a total number of 1023 chips for the C/A code GPS signal. For an exemplary five chip code search, the GPS receiver 44 can determine the code phase of the GPS signal 75 in about 5/1023th of the time that would be required for searching all 1023 chips. Or, the GPS receiver 44 can used the focused code search to improve its signal sensitivity and/or its immunity to a false signal.

Figure 5:
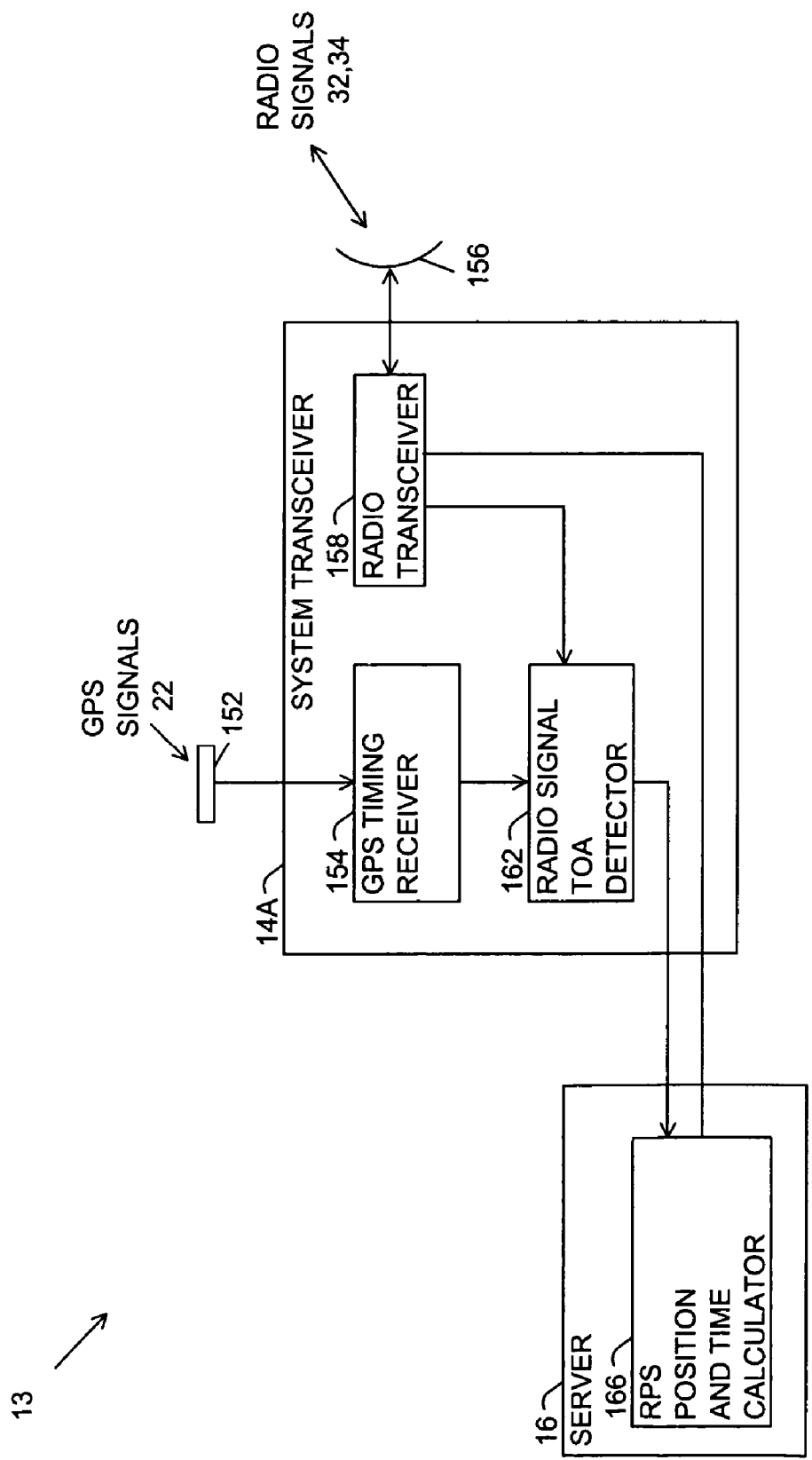
FIG. 5 is a block diagram of a radio positioning system base apparatus of FIG. 1.

FIG. 5 is a simplified block diagram showing the radio positioning system (RPS) apparatus 13 having the system unit 14A and the server 16. The system unit 14A includes a GPS antenna 152, a GPS timing receiver 154, a radio antenna 156, a radio transceiver 158, and a radio signal time-of-arrival (TOA) detector 162. The GPS antenna 152 converts GPS signals 22 from airwave to conducted form and passes the conducted GPS signals to the GPS timing receiver 154. The GPS timing receiver 154 uses the conducted GPS signals for determining a GPS-based clock time and passes the GPS clock time to the TOA detector 162. Other transfer time standards may conceivably be used in the present invention in place of the GPS antenna 152 and the GPS timing receiver 154 if they are maintained or calibrated within a few microseconds of GPS time.

The radio antenna 156 converts the radio positioning signal 32 having the radio positioning message from the mobile unit 12 from an airwave to a conducted form and passes the conducted signal to the radio transceiver 158. Similarly, the radio antenna 156 converts a signal having a system message from the radio transceiver 158 intended for the mobile unit 12 from a conducted form to an airwave form for transmitting the radio system signal 34.

The transceiver 158 passes the radio positioning message to the TOA detector 162. The TOA detector 162 uses the GPS clock time with the radio positioning message for determining a radio signal TOA between the radio antenna 156 and the mobile unit 12. Each of the system units 14A-C operates similarly to the system unit 14A for determining respective GPS-referenced radio signal TOAs from the same mobile unit 12. The radio signal TOAs are passed the server 16. The server 16 includes an RPS position and time calculator 166 for using at least three radio signal TOAs for determining the RPS-based position and the RPS-based time (TOT) for the mobile unit 12. As shown below, the RPS-based position and the RPS-based time are jointly and mutually determined with each other in a combined manner.

An equation 1 below describes the determination of the time-of-transmission (TOT) for the radio positioning signal 32 and the RPS-based position (X, Y, Z) and for mobile unit 12.

$$TOA_j - TOT = [(X_j - X)^2 + (Y_j - Y)^2 + (Z_j - Z)^2]^{1/2}/C \quad (1)$$

In the equation 1, (X, Y, Z) is the position of the mobile unit 12; TOT is the time-of-transmission of the radio positioning signal 32; $(X_j, Y_j, Z_j)$ is the known position of the jth system unit 14A-C; $TOA_j$ is the measured time-of-arrival of the radio positioning signal 32 at the jth system unit 14A-C that is referenced to GPS time; and C is an effective speed of light. The product of $|TOA_j - TOT|$ and the speed of light C is an RPS-based pseudorange $PR_j$ between the jth system unit 14A-C and the mobile unit 12. The equation 1 has four unknowns (X, Y, Z) and TOT. However, in many terrestrial positioning systems the altitude difference $(Z_j - Z)$ can be assumed to be small and can be neglected. When the altitude difference $(Z_j - Z)$ is neglected, the number of unknowns is reduced to three.

The server 16 uses the equation 1 with the three $TOA_j$'s and known positions $(X_j, Y_j)$ for the three system units 14A-C to resolve the three unknowns for a time-of-transmission (TOT) of the radio positioning signal 32 and a two dimensional (2D) position (X, Y) of the mobile unit 12. The 2D position and TOT may be overdetermined using the equation 1 for a fourth system unit. Or a three dimensional (3D) position and TOT may be determined using the equation 1 for a fourth system unit that is not co-planar with the other three system units. A coarse position of the mobile unit 12 may be required by the RPS apparatus 13 as a starting point for resolving the equations 1.

The server 16 passes the RPS-based position and time back to the system unit 14A for transmission in a system message to the mobile unit 12. For redundancy, more than one of the system units 14A-C may be used for transmitting RPS-based position and time, accurate frequency, and ephemeris, almanac and other GPS parameters to the mobile unit 12.

Further details of the system 10 of the present invention are described by Lau et al in the U.S. Pat. entitled "GSM Cellular Telephone and GPS Receiver Combination", U.S. Pat. No. 6,122,506, incorporated herein by reference; and by Loomis in the U.S. Pat. entitled "Hybrid Radio Location System", U.S. Pat. No. 6,430,416 incorporated herein be reference.

Center of Code Search Range

Equations 2, 3, 4 and 4.1 show details for computing or predicting a code search range center. In the equation 2, the RPS-based time TOT and an RPS-based position ($M^E$, $M^N$, $M^U$) are resolved using a plurality of the equations 2 corresponding to a plurality of the system units 14A-C (not limited to three).

$$TOA_j = TOT + ((T_j^E - M^E)^2 + (T_j^N - M^N)^2 + (T_j^U - M^U)^2)^{1/2}/C \quad (2)$$

In the equation 2, "E", "N" and "U" refer to local east, north and up coordinates, respectively, of position; $TOA_j$ is the measured time-of-arrival of the radio positioning signal 32 referenced to GPS time at the jth system unit 14A-C; ($M^E$, $M^N$, $M^U$) are the unknowns for the RPS-based position of the mobile unit 12; TOT is the unknown for the RPS-based time of the time-of-transmission of the radio positioning signal 32; and ($T_j^E$, $T_j^N$, $T_j^U$) is the known location of the jth system unit 14A-C. The unknown RPS-based time (TOT) and the unknown RPS-based position ($M^E$, $M^N$, $M^U$) are determined by resolving four of the equations 2 for four system units j, or three of the equations 2 with an assumed $M^U$ up coordinate for the mobile unit 12 with three system units j, or additional equations 2 and system units j can be used to overdetermine the solution.

The equation 3 shows the RPS-based GPS time estimate time τ is determined from the RPS-based time TOT and the elapsed time ΔT measured locally in the mobile unit 12 since the calibrated TOT trigger.

$$\tau = TOT + \Delta T \quad (3)$$

The equations 4 and 4.1 show the predicted code phase search center $\phi_0^i$ is determined from the RPS-based GPS time estimate time τ minus the transit time. The transit time is the distance between the GPS satellite 24 and the mobile unit 12 divided by the speed of light C.

$$T_0^i = \tau^i - |S^i - M|/C - B^i \quad (4)$$

$$\phi_0^i = T_0^i/TT \quad (4.1)$$

In the equation 4, $T_0^i$ is the time of the predicted code phase search center for the code being received from the ith GPS satellite 24; $\tau^i$ is the RPS-based GPS time estimate for the ith GPS satellite 24; $S^i$ is the location-in-space of the ith GPS satellite 24; M is the RPS-based position ($M^E$, $M^N$, $M^U$) of the mobile unit 12; and $B^i$ is a known code phase transmission time offset of the ith GPS satellite 24 carried in the ephemeris or almanac parameters for that GPS satellite 24.

The time $T^i_0$ prescribes a position in the code imposed on the GPS signal 22 transmitted from the ith GPS satellite 24. This code is divided into a series of twenty millisecond data bits. Each data bit is divided into twenty identical one millisecond Gold codes. Each Gold code is divided into a known sequence of 1023 chips of about 0.9775 microseconds in length. By identifying the transmission time of the incoming GPS signal 22 within a few microseconds, the position of the received code can be identified within a few chips.

The equation 4.1 has a modulo of the time TT for converting the time $T^i_0$ to the phase $\phi^i_0$ of the predicted code phase search center. The TT may be taken to be the length of time of the phase correlation integration period.

When the incoming data bits are known, the chip sequence is known for many seconds and the integration period TT may be selected up to many seconds. Even when the incoming data bits are not known, the chip sequence is known at least twenty milliseconds (between possible data bit edges) and TT is typically selected from one to twenty milliseconds (or more if data bit senses are known or assumed). For the GPS C/A code for example, each phase is approximately 0.9775 microseconds long. For the time TT of one millisecond there are 1023 phases. For the time TT of ten milliseconds it may be considered that there are 10*1023 phases, for the time TT of twenty milliseconds there are 20*1023 phases, and so on.

Width of Code Search Range

Details are described below for selecting the search width of the code search range about the search range center $\phi^i_0$ for the ith GPS satellite 24. The search width may be selected based upon the standard deviation for the error $\sigma^i$ for the predicted code phase center $\phi^i_0$ for the ith GPS satellite 24 and the number of standard deviations that are desired in a tradeoff between fewer standard deviations for greater speed or more standard deviations for greater assurance of finding the correct code phase within the range. The error $\sigma^i$ depends upon the expected accuracies of the RPS-based time and the RPS based position which depend in part upon several factors including the three dimensional RPS line-of-sight (LOS) vectors between the system units 14A-C (not limited to three) and the mobile unit 12.

An RPS LOS matrix, referred to as H, has dimensions (K×4) or ((K+1)×4), where K is the number of system units j. The generation of the H matrix requires a coarse user position from some other means. Of the four columns, the first three of each row correspond to a three-dimensional common coordinate system. A local east-north-up (E-N-U) is used as an example. The last column corresponds to an error estimate for the RPS-based time TOT.

The RPS line-of-sight (LOS) matrix H may have an extra row corresponding to a coarse estimate of altitude. The altitude may be critical in some locations. For example, Denver is at an approximate altitude of 1500 meters, or five microseconds relative to sea level, which is a large offset to the search center $\phi^i_0$, equal to five chips of GPS C/A code. Best results are obtained when the altitude estimate is accurate to better than one chip (300 meters for C/A code GPS). The elements of the altitude row are (0, 0, 1, 0).

An example of the RPS LOS matrix with three system units 14A-C and an altitude constraint is:

$$\begin{bmatrix} H_1^E, & H_1^N, & H_1^U, & 1 \\ H_2^E, & H_2^N, & H_2^U, & 1 \\ H_3^E, & H_3^N, & H_3^U, & 1 \\ 0, & 0, & 1/C, & 0 \end{bmatrix}$$

Each of the first K rows of the RPS LOS matrix H corresponds to a system unit j. For each system unit j, the first three elements of the corresponding rows are defined as follows:

$$H_j^E = \partial TOA_j/\partial M^E = (T_j^E - M^E)/(C^*|T_j - M|);$$

$$H_j^N = \partial TOA_j/\partial M^N = (T_j^N - M^N)/(C^*|T_j - M|); \text{ and}$$

$$H_j^U = \partial TOA_j/\partial M^U = (T_j^U - M^U)/(C^*|T_j - M|).$$

The ($T_j^E$, $T_j^N$, $T_j^U$) is the position of the jth system unit; $|T_j-M|$ is the distance between the jth system unit and the mobile unit 12; and ($M^E$, $M^N$, $M^U$) is the position of the mobile unit 12. In some locations, the altitude term ($T_j^U - M^U$)/$|T_j-M|$) is near zero and can be ignored with a small corresponding increase in the error $\sigma^i$. A matrix R is defined for an error covariance of the $TOA_j$ measurements at the system units j. This includes effects of system unit survey error, measurement noise, and other random system timing errors. The $TOA_j$ measurement errors may be modeled to be independent with equal variances "r" (homoskedastic), in which case matrix R=r * I, where I is the identity matrix.

A "q" is defined as an error variance of the timing between the GPS digital signal processing clock and the cellphone GSM digital signal processing clock. This error includes small variations in hardware or software delay $\delta B$ and the clock drift error. The variations in delay $\delta B$ includes event capture quantization. The clock drift error is the drift rate $\delta f/f$ of the frequency reference 50 times the elapsed time $\Delta T$ between the TOT trigger and the current time. For example, a clock drift rate $\delta f/f$ of 0.1 parts per million (ppm) for an elapsed time $\Delta T$ between five and one-hundred twenty seconds leads to an error variance q of between 0.5 and 12 microseconds.

In a similar manner to the rows of the H matrix, $LOS^i$ vector is a line-of-sight from the mobile unit 12 to the ith GPS satellite 24. The ith GPS satellite 24 is denoted as $S^i$. An equation 5 shows the GPS $LOS^i$.

$$LOS^i = ((S_E^i - M_E)/|S^i - M|, (S_N^i - M_N)/|S^i - M|, (S_U^i - M_U)/|S^i - M|, 1) \quad (5)$$

The one sigma error $\sigma^i$ of the search range center $\phi^i_0$ in terms of the error variance q, the GPS satellite line-of-sight vector $LOS^i$, the $TOA_j$ error covariance matrix R, and the RPS LOS matrix H is given by equation 6.

$$\sigma^i = (q + LOS^{i*}(H^T*R^{-1}*H)^{-1}*(LOS^i)^T/C^2)^{1/2} \quad (6)$$

In the case of homoskedastic errors for $TOA_j$ the equation 6 is simplified to equation 7.

$$\sigma^i = (q + LOS^{i*}(H^T*H)^{-1}*(LOS^i)^T*r/C^2)^{1/2} \quad (7)$$

From the equations 6 or 7, the search width for capturing the GPS signal 22 within the code search range is $\pm\sigma^i$ (total width of $2\sigma^i$) for a one sigma probability, $\pm 2\sigma^i$ (total width of $4\sigma^i$) ) for a two sigma probability, $\pm 3\sigma^i$ (total with of $6\sigma^i$) for a three sigma probability, and so on.

Figure 6:
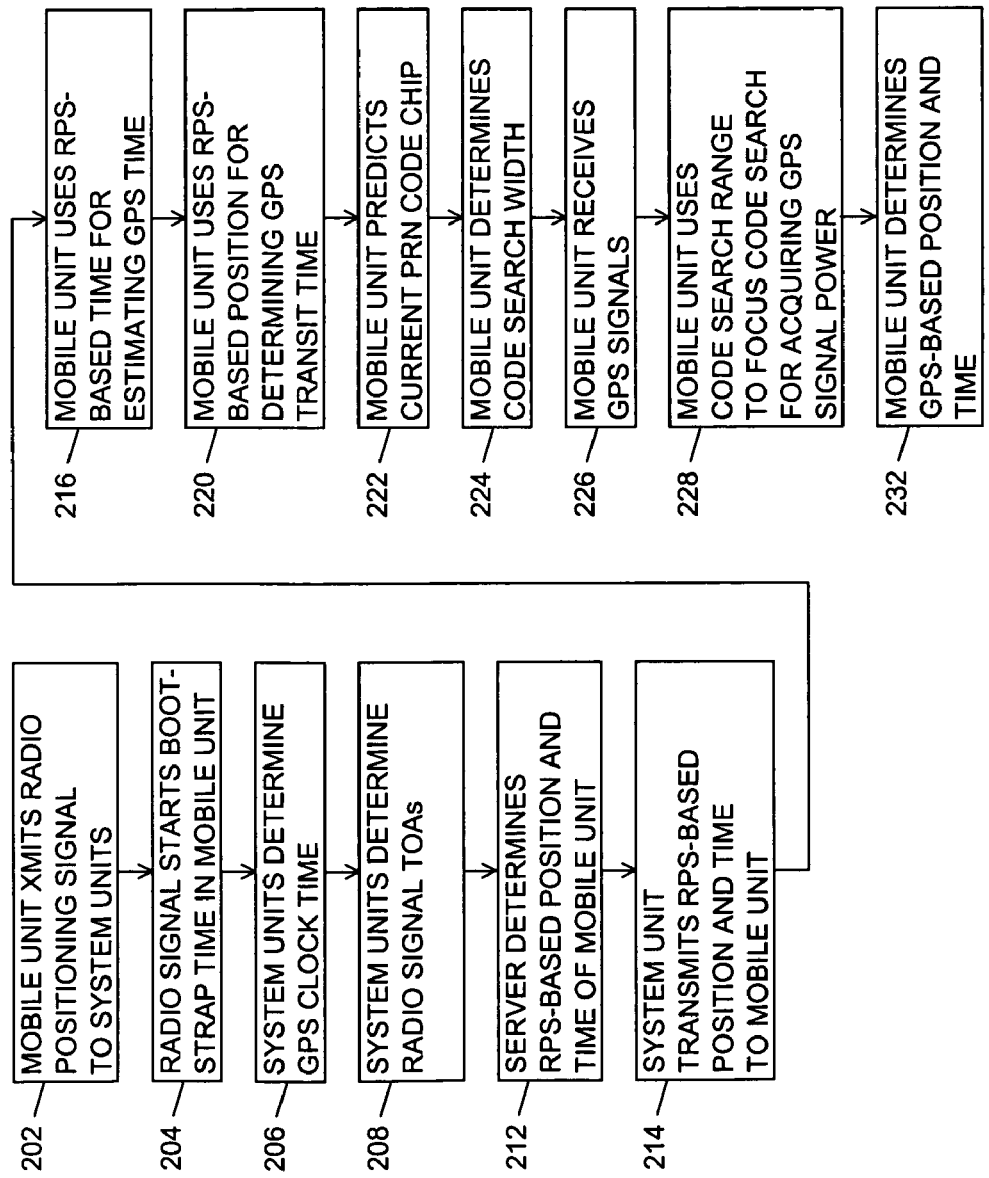
FIG. 6 is a flow chart showing a method of the present invention for determining location.

FIG. 6 is a flow chart of a method of the present invention for a fast time to first fix for the mobile unit 12 in the location system 10 using GPS signals 22 from GPS satellites 24. In a step 202 the mobile unit transmits the radio positioning signal 32 to three or more system units 14A-C of the radio positioning system (RPS) apparatus 13. In a step 204 the mobile unit starts tracking the bootstrap elapsed time from the time-of-transmission (TOT) of the radio positioning signal.

The system units receive the GPS signals and determine an accurate GPS clock time in a step 206. In a step 208 the system units use the GPS clock time with the radio positioning signal 32 to determine times-of-arrival (TOA)s of the radio positioning signal. In a step 212 the RPS apparatus 13 uses the radio signal TOAs and known positions of the system units for determining an RPS-based position for the mobile unit and time-of-transmission TOT of the radio positioning signal 32. The RPS-based position and time are determined together by resolving a set of equations having the TOAs and the locations of the system units. In a step 214 the RPS apparatus 13 transmits the RPS-based position and time back to the mobile unit.

The mobile unit uses the RPS-based time and the bootstrap elapsed time in a step 216 for determining an RPS-based GPS time estimation. In a step 220 the mobile unit uses the RPS-based position for determining a transit time for the GPS signal from the GPS satellite. In a step 222 the mobile unit predicts the current PRN code chip from the RPS-based GPS time estimate and the transit time. In a step 224 the mobile unit determines a search width for the code search range. The determination uses the expected accuracies of the RPS-based position and time, the expected accuracies of the TOAs, the dilution of precision of the system units, the dilution of precision of the GPS satellites, the length of the elapsed bootstrap time, the drift rate of the clocks in the mobile unit, and various quantization errors. In a step 226, the mobile unit receives the GPS signals. In a step 228 the mobile unit uses the code search range for a narrow GPS code search for determining the code phase timing of the GPS signals. Then, in a step 232 the mobile unit uses the code phase timing for acquiring the GPS signals and determining a GPS-based position and time.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A location system, comprising:
a mobile radio transceiver for transmitting a radio positioning signal and receiving a radio system signal having a radio positioning system (RPS)-based time and an RPS-based position jointly derived from said radio positioning signal; and
a mobile global navigation satellite system (GNSS) receiver including a code range selector using said RPS-based time and said RPS-based position for selecting a code search range and a code recovery circuit using said code search range for acquiring a GNSS signal; and wherein:
the code range selector includes a bootstrap clock for determining an elapsed time from a time-of-transmission (TOT) of said radio positioning signal and a GNSS time estimator for using said elapsed time and said RPS-based time for providing an RPS-based GNSS time estimate; and
the code range selector uses said RPS-based GNSS time estimate for selecting said code search range.

2. The system of claim 1, wherein:
said RPS-based time and said RPS-based position are jointly derived from plurality of radio signal times-of-arrival (TOA)s determined from said radio positioning signal for a plurality of system locations, respectively.

3. The system of claim 1, wherein:
said RPS-based time and said RPS-based position are derived by resolving a plurality of equations in the form of:

$$TOA_j - TOT = [(X_j - X)^2 + (Y_j - Y)^2]^{1/2}/C$$

where the TOT is the RPS-based time; the (X,Y) is the RPS-based position; the $(X_j, Y_j)$ is a jth one of said system locations; the $TOA_j$ is the TOA at said jth system location; and the C is the speed of light.

4. The system of claim 2, wherein:
said RPS-based time and said RPS-based position are derived by resolving a plurality of equations in the form of:

$$TOA_j - TOT = [(X_j - X)^2 + (Y_j - Y)^2 + (Z_j - Z)^2]^{1/2}/C$$

where the TOT is the RPS-based time; the (X,Y,Z) is the RPS-based position; the $(X_j, Y_j, Z_j)$ is a jth one of said system locations; the $TOA_j$ is the TOA at said jth system location; and the C is the speed of light.

5. The system of claim 1, wherein:
the code range selector includes a search width sizer for using an expected accuracy of said RPS-based time and an expected accuracy of said RPS-based position for determining a search width for said code search range.

6. The system of claim 5, wherein:
said-search width sizer further uses an RPS line-of-sight matrix for determining said search width.

7. The system of claim 5, wherein:
said GNSS signal is a global positioning system (GPS) signal having a pseudorandom noise (PRN) code; and
said search width is between five and twenty-five chips for said code.

8. The system of claim 1, wherein:
said code search range is less than twenty-five microseconds.

9. The system of claim 1, wherein:
the code range selector further includes a chip pointer for combining said RPS-based GNSS time estimate with a transit time of said GNSS signal for predicting a code phase for said code search range.

10. The system of claim 9, wherein:
the code range selector further includes a satellite locator for using said RPS-based GNSS time estimate with GNSS orbital parameters for determining a location-in-space for a GNSS signal source transmitting said GNSS signal; and a transit time calculator for using said RPS-based position with said location-in-space for determining said transit time.

11. The system of claim 1, further comprising:
a plurality of system units for determining a plurality of radio signal times-of-arrival (TOA)s, respectively, from said radio positioning signal; and
a server for determining said RPS-based time and said RPS-based position from said radio signal TOAs.

12. The system of claim 1, wherein:
said GNSS receiver is a global positioning system (GPS) receiver; and
said GNSS signal is a GPS signal.

13. A mobile location method, comprising:
transmitting a radio positioning signal from a mobile unit;
receiving a radio system signal in said mobile unit having a radio positioning system (RPS)-based time and an RPS-based position jointly derived from said radio positioning signal;
selecting a code search range according to said RPS-based time and said RPS-based position; and
acquiring a GNSS signal using said selected code search range; and wherein:
selecting said code search range includes: determining an elapsed time in said mobile unit from a time-of-transmission (TOT) of said radio positioning signal; using said TOT elapsed time with said RPS-based time for providing an RPS-based GNSS time estimate; and using said RPS-based GNSS time estimate for selecting said code search range.

14. The method of claim 13, wherein:
said RPS-based time and said RPS-based position are jointly derived from a plurality of radio signal times-of-arrival (TOA)s determined from said radio positioning signal for a plurality of system locations, respectively.

15. The method of claim 14, wherein:
said RPS-based time and said RPS-based position are derived by resolving a plurality of equations in the form of:

$$TOA_j - TOT = [(X_j - X)^2 + (Y_j - Y)^2]^{1/2}/C$$

where the TOT is the RPS-based time; the (X,Y) is the RPS-based position; the $(X_j, Y_j)$ is a jth one of said system locations; the $TOA_j$ is the TOA at said jth system location; and the C is the speed of light.

16. The method of claim 14, wherein:
said RPS-based time and said RPS-based position are derived by resolving a plurality of equations in the form of:

$$TOA_j - TOT = [(X_j - X)^2 + (Y_j - Y)^2 + (Z_j - Z)^2]^{1/2}/C$$

where the TOT is the RPS-based time; the (X,Y, Z) is the RPS-based position; the $(X_j, Y_j, Z_j)$ is a jth one of said system locations; the $TOA_j$ is the TOA at said jth system location; and the C is the speed of light.

17. The method of claim 13, wherein:
selecting said code search range includes determining a search width for said code search range from an expected accuracy of said RPS-based time and an expected accuracy of said RPS-based position.

18. The method of claim 17, wherein:
determining said search width further includes using an RPS line-of-sight matrix for determining said search width.

19. The method of claim 17, wherein:
said GNSS signal is a global positioning system (GPS) signal having a pseudorandom noise (PRN) code; and
said search width is between five and twenty-five chips for said code.

20. The method of claim 13, wherein:
selecting said code search range further includes combining said RPS-based GNSS time estimate with a transit time of said GNSS signal for predicting a code phase for said code search range.

21. The method of claim 20, wherein:
selecting said code search range further includes using said RPS-based GNSS time estimate with GNSS orbital parameters for determining a location-in-space for a GNSS signal source transmitting said GNSS signal; and using said RPS-based position with said location-in-space for determining said transit time.

22. The method of claim 13, further comprising:
determining a plurality of radio signal times-of-arrival (TOA)s at a plurality of system positions, respectively, from said radio positioning signal; and
determining said RPS-based time and said RPS-based position from said radio signal TOAs.

23. The method of claim 13, wherein:
said GNSS receiver is a global positioning system (GPS) receiver; and
said GNSS signal is a GPS signal.

24. The method of claim 13, wherein:
said code search range is less than twenty-five microseconds.

* * * * *